United States Patent
Harter, Jr.

(10) Patent No.: US 8,214,857 B2
(45) Date of Patent: Jul. 3, 2012

(54) GENERATING A COMBINED VIDEO STREAM FROM MULTIPLE INPUT VIDEO STREAMS

(75) Inventor: William Wood Harter, Jr., Aliso Viejo, CA (US)

(73) Assignee: International Business Machines Corporation, Armonk, NY (US)

( * ) Notice: Subject to any disclaimer, the term of this patent is extended or adjusted under 35 U.S.C. 154(b) by 853 days.

(21) Appl. No.: 12/129,614

(22) Filed: May 29, 2008

(65) Prior Publication Data

US 2009/0300676 A1   Dec. 3, 2009

(51) Int. Cl.
*H04N 7/10* (2006.01)
(52) U.S. Cl. ............. 725/35; 725/32; 725/13; 386/351; 348/571
(58) Field of Classification Search .............. 725/32; 348/571
See application file for complete search history.

(56) References Cited

U.S. PATENT DOCUMENTS

| | | | |
|---|---|---|---|
| 6,965,726 B2 * | 11/2005 | Leyendecker et al. | 386/343 |
| 7,394,450 B2 * | 7/2008 | Shibamiya et al. | 345/156 |
| 2002/0144262 A1 * | 10/2002 | Plotnick et al. | 725/32 |
| 2004/0103429 A1 * | 5/2004 | Carlucci et al. | 725/32 |
| 2004/0218099 A1 * | 11/2004 | Washington | 348/571 |
| 2005/0097599 A1 | 5/2005 | Plotnick et al. | |
| 2005/0216932 A1 | 9/2005 | Danker | |
| 2006/0277569 A1 | 12/2006 | Smith | |
| 2006/0280431 A1 * | 12/2006 | Blattman et al. | 386/68 |
| 2008/0059997 A1 | 3/2008 | Plotnick et al. | |
| 2008/0155581 A1 * | 6/2008 | Leary | 725/13 |

FOREIGN PATENT DOCUMENTS

| | | |
|---|---|---|
| EP | 1936970 A2 | 6/2008 |
| JP | 2004112184 A | 4/2004 |

OTHER PUBLICATIONS

Smiley, R.M., "Advertising Avoidance and Digital Video Recorders", Honors in the Major, Article 108, 2005, 66 pp.
PCT International Search Report and Written Opinion, Sep. 3, 2009, for International Application No. PCT/EP2009/056555, 10 pp.
English Abstract and Machine Translation for JP2004112184A, published Apr. 8, 2004, Total 47 pp.
IDS Report, Aug. 31, 2011, from the Aug. 23, 2011 Office Action for SVL920080023JP1, Total 2 pp.

* cited by examiner

*Primary Examiner* — James R. Sheleheda
*Assistant Examiner* — Anthony Bantamoi
(74) *Attorney, Agent, or Firm* — David W. Victor; Konrad Raynes & Victor LLP (57) ABSTRACT

Provided are a method, system, and article of manufacture for generating a combined video stream from multiple input video streams. A first video stream including a first product commercial generated to be played at a first playback speed and a second video stream including a second product commercial generated to be played at a second playback speed are processed. The second playback speed is faster than the first playback speed. A combined video stream is generated including a first panel in each frame to display the first video stream and a second panel in each frame to display the second video stream. When the combined video stream is played at the first playback speed the second video stream is rendered to appear at a slower speed than the second playback speed for which it was generated. When the combined video stream is played at the second playback speed the first video speed is rendered to appear at a faster speed than the first playback speed for which it was generated.

25 Claims, 4 Drawing Sheets

GENERATING A COMBINED VIDEO STREAM FROM MULTIPLE INPUT VIDEO STREAMS

BACKGROUND OF THE INVENTION

1. Field of the Invention

The present invention relates to a method, system, and article of manufacture for generating a combined video stream from multiple input video streams.

2. Description of the Related Art

Video playback devices, such as a digital video recorder (DVR), allow users to record a broadcasted program which may have commercials. The users may then use the DVR to play back the recorded program and forward through the commercials. In fast forward mode, the commercial may not be intelligible to the user. Advertisers of the products may pay less advertising fees for commercials that are being skipped and not observed at a fast rate. Content providers and cable companies are believed to have lost substantial revenues due to users fast forwarding through or skipping commercials in content recorded on their DVRs. Some industry members have called to remove the fast forward option from DVRs.

There is a need in the art for improved techniques to provide meaningful commercial content in an environment where users often have the capability to fast forward through commercials.

SUMMARY

Provided are a method, system, and article of manufacture for generating a combined video stream from multiple input video streams. A first video stream including a first product commercial generated to be played at a first playback speed and a second video stream including a second product commercial generated to be played at a second playback speed are processed. The second playback speed is faster than the first playback speed. A combined video stream is generated including a first panel in each frame to display the first video stream and a second panel in each frame to display the second video stream. When the combined video stream is played at the first playback speed the second video stream is rendered to appear at a slower speed than the second playback speed for which it was generated. When the combined video stream is played at the second playback speed the first video speed is rendered to appear at a faster speed than the first playback speed for which it was generated.

In a further embodiment, the first and second video streams have first and second frame rates, respectively, wherein the first frame rate is greater than the second frame rate.

In a further embodiment, generating the combined video stream comprises generating each frame of the first video stream into at least one frame of the first panel in the combined video stream at a first ratio of frames in the first video stream to frames in the combined video stream; generating each frame of the second video stream into at least one frame of the second panel in the combined video stream at a second ratio of frames in the second video stream to frames in the combined video stream, wherein the second ratio is greater than the first ratio such that frames in the second video stream are generated into more frames in the second panel in the combined video stream than the frames in the first video stream are generated into the frames of the first panel in the combined video stream.

In a further embodiment, the first and second video streams are separately filmed at the first and the second frame rates, respectively.

In a further embodiment, the first and second video streams are separately filmed at a same frame rate, wherein the second video stream includes events included in the first video stream. The same events in the second video stream appear on more frames than the same events in the first video stream.

In a further embodiment, an input video stream including product commercial content filmed at a filming frame rate is received. The input video stream is processed to generate the first video stream including the input video stream generated to be played at the first playback speed, wherein the first product commercial comprises the product commercial content at the first playback speed. The input video stream is processed to generate the second video stream generated to be played at the second playback speed, wherein the second product commercial comprises the product commercial content at the second playback speed.

In a further embodiment, the first playback speed is at the filming frame rate and the second playback speed is at a frame rate less than the filming frame rate.

In a further embodiment, the first playback speed is a normal speed and the second playback speed is a fast forward speed for a video player device.

In a further embodiment, the processing and generating operations are performed by post production software to generate the product commercial in the first and second panels of the combined video stream.

In a further embodiment, user input is received indicating sizes of the first and second panels in each frame of the combined video stream, wherein the first and second panels have sizes in the combined video stream corresponding to their indicated sizes.

In a further embodiment, the indicated sizes of the first and second panels are based on percentages of a viewing audience estimated to watch the first and second panels. The first or second panel having a higher estimated viewing audience is set to a greater size in the frame than the first or second panel having a lower estimated viewing audience.

In a further embodiment, the combined video stream is inserted in a broadcast as a commercial segment.

In a further embodiment, the first and second product commercial comprise commercials for different products.

In a further embodiment, the first and second product commercial comprise commercials for a same product.

In a further embodiment, the first and second video streams include commercials for a plurality of products.

DETAILED DESCRIPTION

Figure 1:
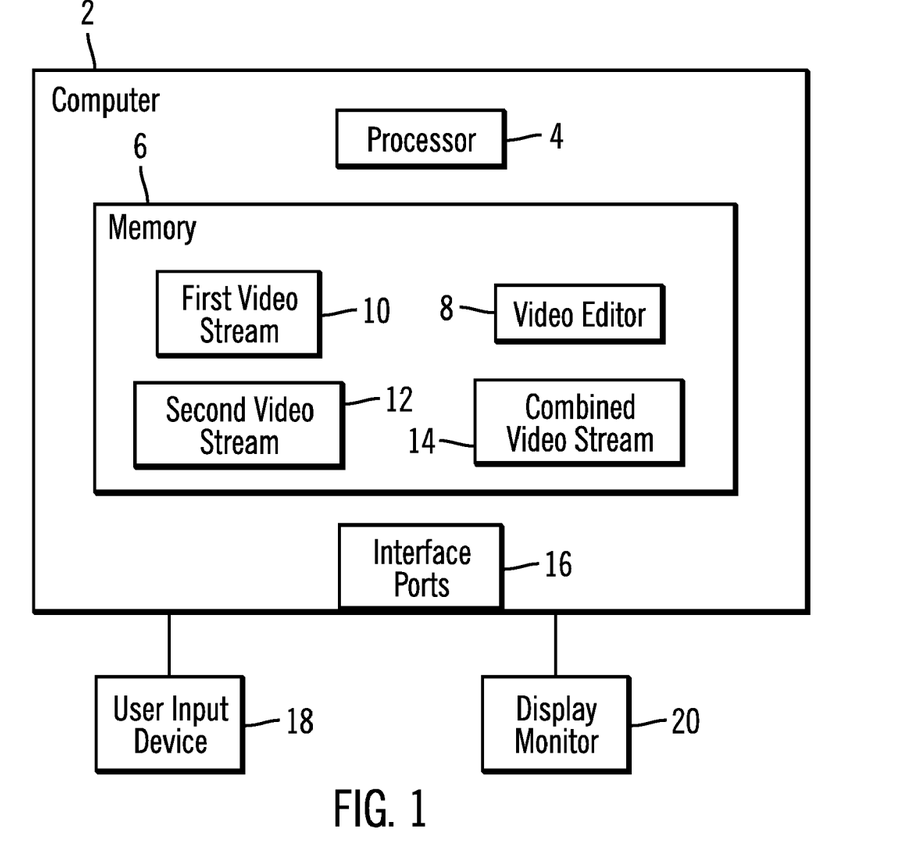
FIG. 1 illustrates an embodiment of a computing environment.

FIG. 1 illustrates an embodiment of a computing environment. A computer 2 includes one or more processors 4 and a memory 6 in which programs are loaded for execution by the processor. The processor 4 executes a video editor 8 program to process a first video stream 10 and a second video stream 12 to generate a combined video stream 14 in which the video streams 10, 12 are combined. The computer 2 includes one or more interface ports 16 which may interface with an external device to receive video streams from a storage or film camera device.

The user of the computer 2 may utilize an input device 18 to interact with the video editor 8 to control the video editor 8 operations and perform non-linear editing of the video 10, 12, and 14 images. The input device 18 may comprise a mouse, keyboard, pen-stylus, microphone, touch screen, etc. controlled by a user to provide user input to a computer program. A display monitor 20 may display a user interface for the video editor 8 to allow editing of the first 10 and second 12 video streams and the combined video stream 14. The processor 4 may comprise one or more central processing units (CPUs) and the memory 6 may comprise one or more non-volatile or volatile memory devices.

The video streams 10, 12, 14 may comprise frames of images in a digital video format, such as Moving Picture Experts Group (MPEG), Audio Video Interleave (AVI), etc.

Figure 2:
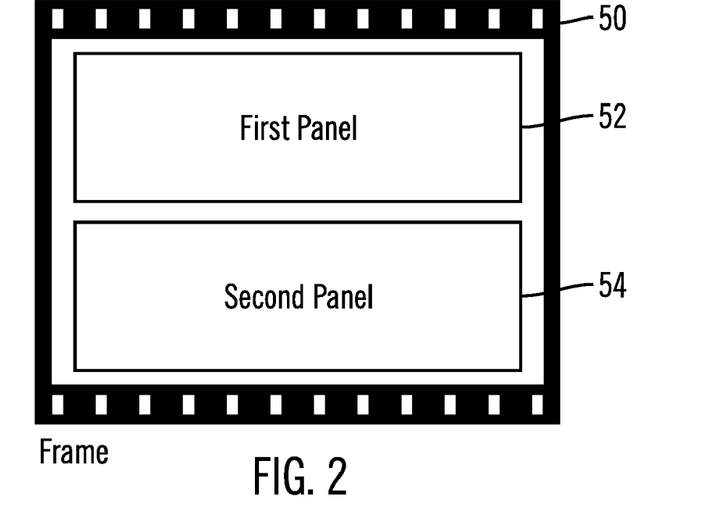
FIG. 2 illustrates an embodiment of a frame.

FIG. 2 illustrates an embodiment of a frame 50 in the combined video stream 14 including a first panel 52 and a second panel 54 of content, where multiple of the frames 50 played render a video image. The video editor 8 generates the content of the first video stream 10 into the first panel 52 and the content of the second video stream 12 into the second panel 54. In one embodiment, the first video stream 10 may be generated to be played at a normal playback speed and the second video stream 10 may be generated to be played at a playback speed faster than the normal speed, such as a fast forward speed in a video device player, such as a DVR. The panels 52 and 54 may be positioned in a vertical orientation as shown, or alternatively in a horizontal orientation or different positions and orientations. The panels 52 and 54 may have a same size or different sizes.

The first video stream 10 may have a first frame rate, i.e., frames per second, at which the combined video stream 14 will be played by a video playback device, e.g., digital video record (DVR), cable receiver, etc., and the second video stream 12 may have a second frame rate less than the first rate. Thus, if the combined video stream 14 is played at the faster second playback speed, then the slower second video stream 12 in the second panel 54 may appear to a user to be rendered at the "normal" comprehendible speed, while the faster first video stream 10 in the first panel 52 may appear to be played at a faster than normal, e.g., fast forward speed, that is not comprehensible. If the combined video stream 14 is played at the normal first playback speed, then the slower second video stream 12 in the second panel 54 may appear to a user to be rendered at a slow motion rate, while the faster first video stream 10 in the first panel 52 may appear to be played at a normal rate.

In an alternative embodiment, the first 10 and second 12 video streams may be filmed at the same frame rate, but the content in the second video stream 12 may appear for a longer duration than in the first video stream 12. For instance, the first 10 and second 12 video streams may include the same events, e.g., displayed text, actions, images, etc., where the second video stream 12 has the same events spread out across more frames than the first video steam 10, i.e., the first video stream 10 has more events per minute than the second video stream 12. In this embodiment, in the first playback speed, the events in the first video stream 10 may appear to be displayed at a normal speed while the events in the second video stream 12 appear to be in slow motion. In the second faster playback speed, the events in the first video stream 10 may appear to be displayed at a fast forward speed while the events in the second video stream 12 appear to be at a normal speed to the human user.

Yet further, the computer 2 may receive an input video stream on the interface port 16 and generate the first 10 and second 12 video streams from the received input video stream.

In one embodiment, the first 10 and second 12 video streams may comprise the same product commercial filmed at different frame rates, where the second video stream 12 is filmed at a slower rate. If the product commercial in the first 10 and second 12 video streams are separately filmed or edited, then they may include some or all common content. Alternatively, different content may be filmed for the different intended playback speeds.

Yet further, the first 10 and second 12 video streams may include different product commercials. Further, the first 10 and second 12 video streams generated for a commercial broadcast segment may include multiple product commercials for the same or different products. The video streams 10, 12 can include different commercials for a same product or different commercials for different products.

Figure 3:
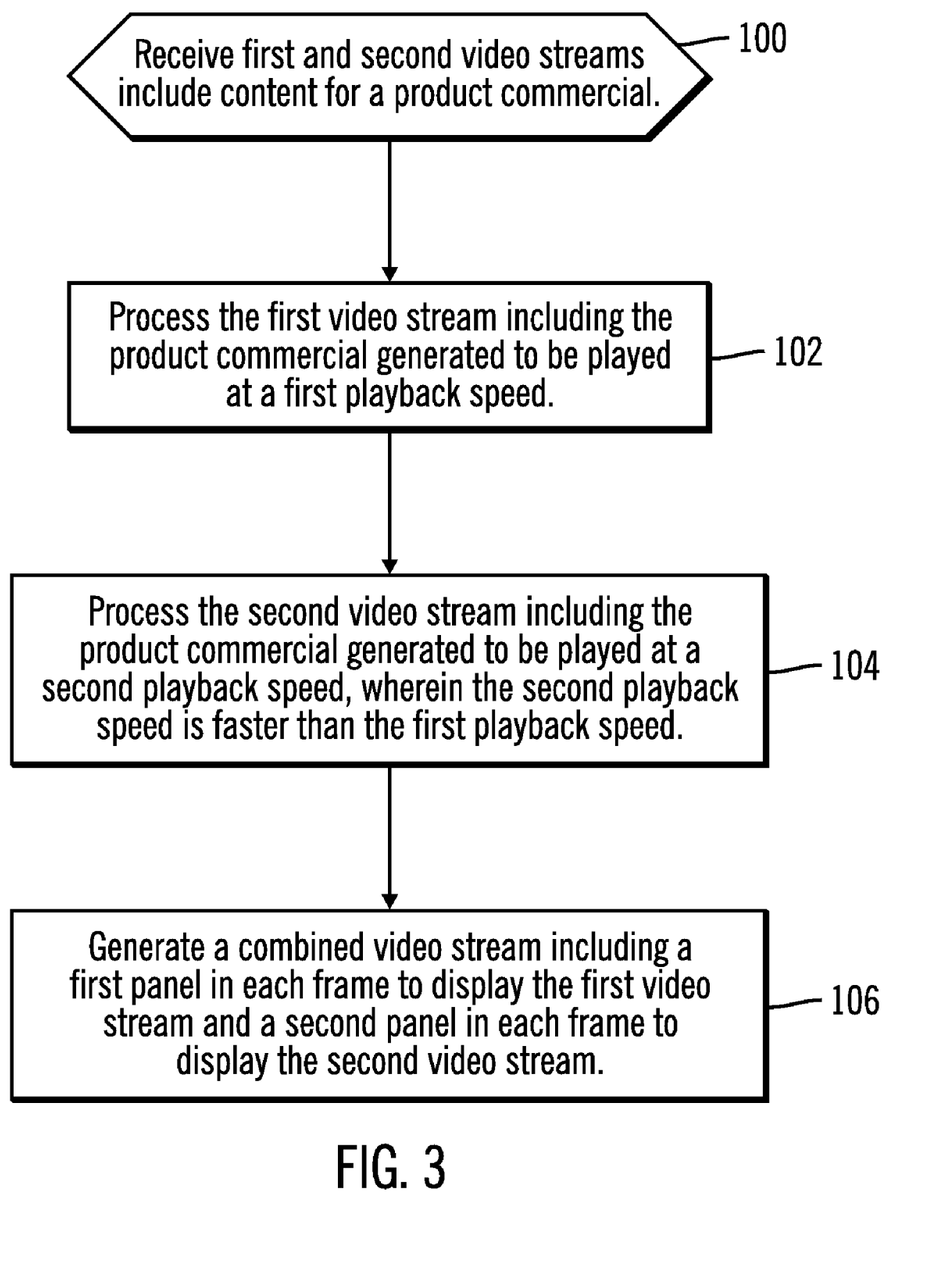
FIGS. 3, 4, and 5 illustrate embodiments of operations to generate a combined video stream.

FIG. 3 illustrates an embodiment of operations performed by the video editor 8 to generate the combined video stream 14. Upon receiving (at block 100) first 10 and second 12 video streams including content for a product commercial, the video editor 8 processes (at block 102) the first video stream 10 including the product commercial generated to be played at a first playback speed, such as a normal playback speed on a playback device, e.g., DVR. The video editor 8 processes (at block 104) the second video stream 12 including the product commercial generated to be played at a second playback speed, wherein the second playback speed is faster than the first playback speed, such as a fast forward speed on the playback device, e.g., DVR. The video editor 8 generates (at block 106) a combined video stream 14 including a first panel 52 in each frame 50 to display the first video stream 10 and a second panel 54 in each frame 50 to display the second video stream 12.

Figure 4:
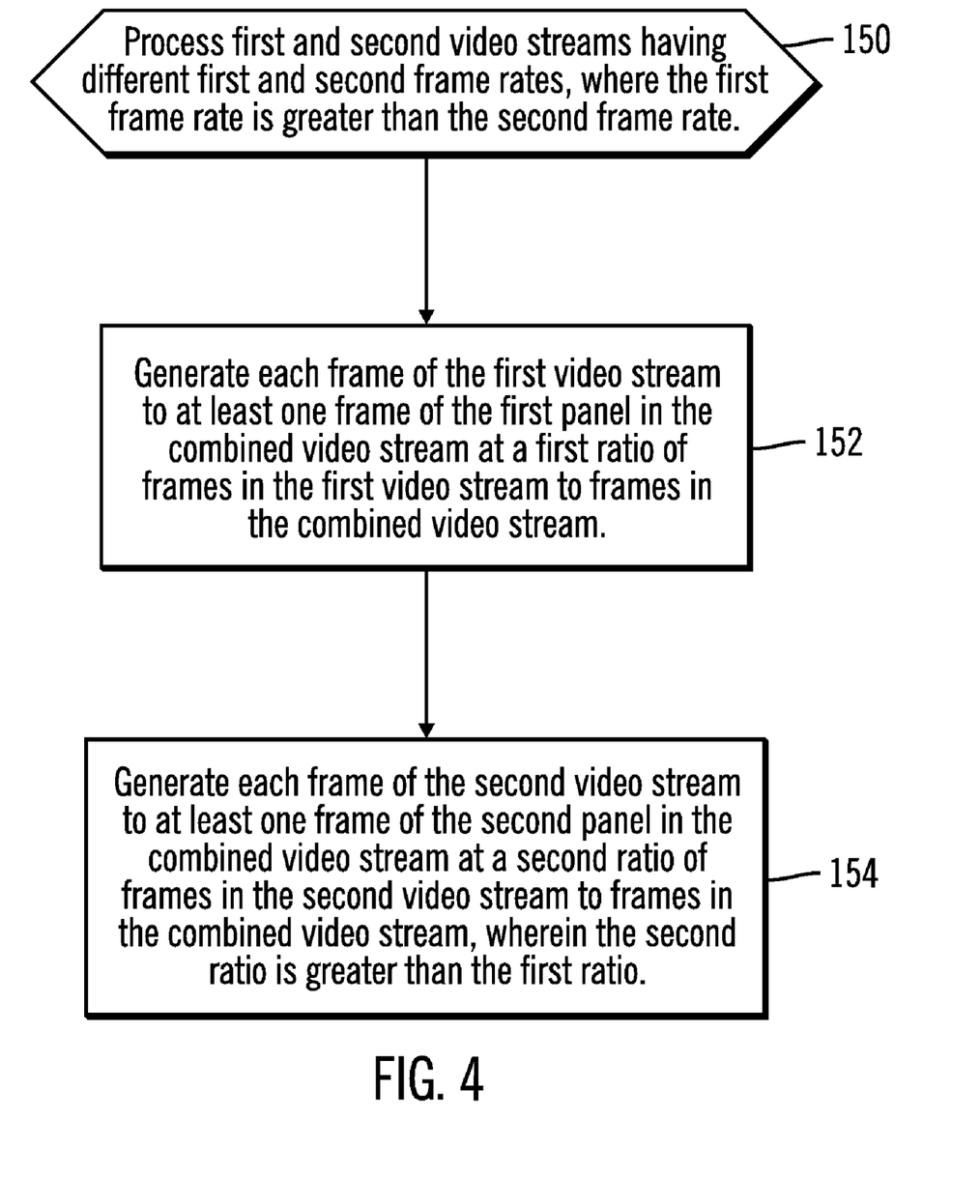

FIG. 4 illustrates a further embodiment of operations performed by the video editor 8 to generate the combined video stream 14. The operations at block 150 and 154 may be performed as part of the operation at block 106 to generate the combined video stream 14. At block 150, the video editor 8 processes (at block 150) first 10 and second video 12 streams having different first and second frame rates, where the first frame rate is greater than the second frame rate. The video editor 8 generates (at block 152) each frame of the first video stream 10 into at least one frame of the first panel 52 in the combined video stream 14 at a first ratio of frames in the first video stream 10 to frames in the combined video stream 14. For instance, if the first video stream 10 and the combined video stream 14 are at a same frame rate, e.g., 24 frames per second, than there may be a one-to-one mapping of frames from the first video stream 10 to the combined video stream 14. If the frame rates of the first video stream 10 and combined video stream 14 differ, than their may be some adjustment to map frames from the first video stream 10 to the second. The video editor 8 further generates (at block 154) each frame of the second video stream 12 into at least one frame of the second panel 54 in the combined video stream at a second ratio of frames in the second video stream 12 to frames in the combined video stream 14. To generate frames from the video streams 10, 12 to the panels 52, 54, the video editor 8 may tile the frames, insert, superimpose and/or further fade or otherwise edit or modify the frames from the video streams 12, 14 being generated into the panels 52, 54.

In certain embodiments, the second ratio is greater than the first ratio. This means that the frames in the second video stream 12 are generated into more frames in the combined video stream 14 than is the first video stream 10. For instance, if the second video stream 12 has a frame rate of 12 frames per second and the combined video stream 14 has a frame rate of 24 frames per second, then each frame of the second video stream 12 may be mapped to multiple frames of the combined video stream 14. In this way, the second video stream 12 may appear to be in slow motion if played back at the playback speed intended for the combined video stream 14, but appear to be at a normal playback speed if the combined video stream 14 is played at a fast forward speed.

Figure 5:
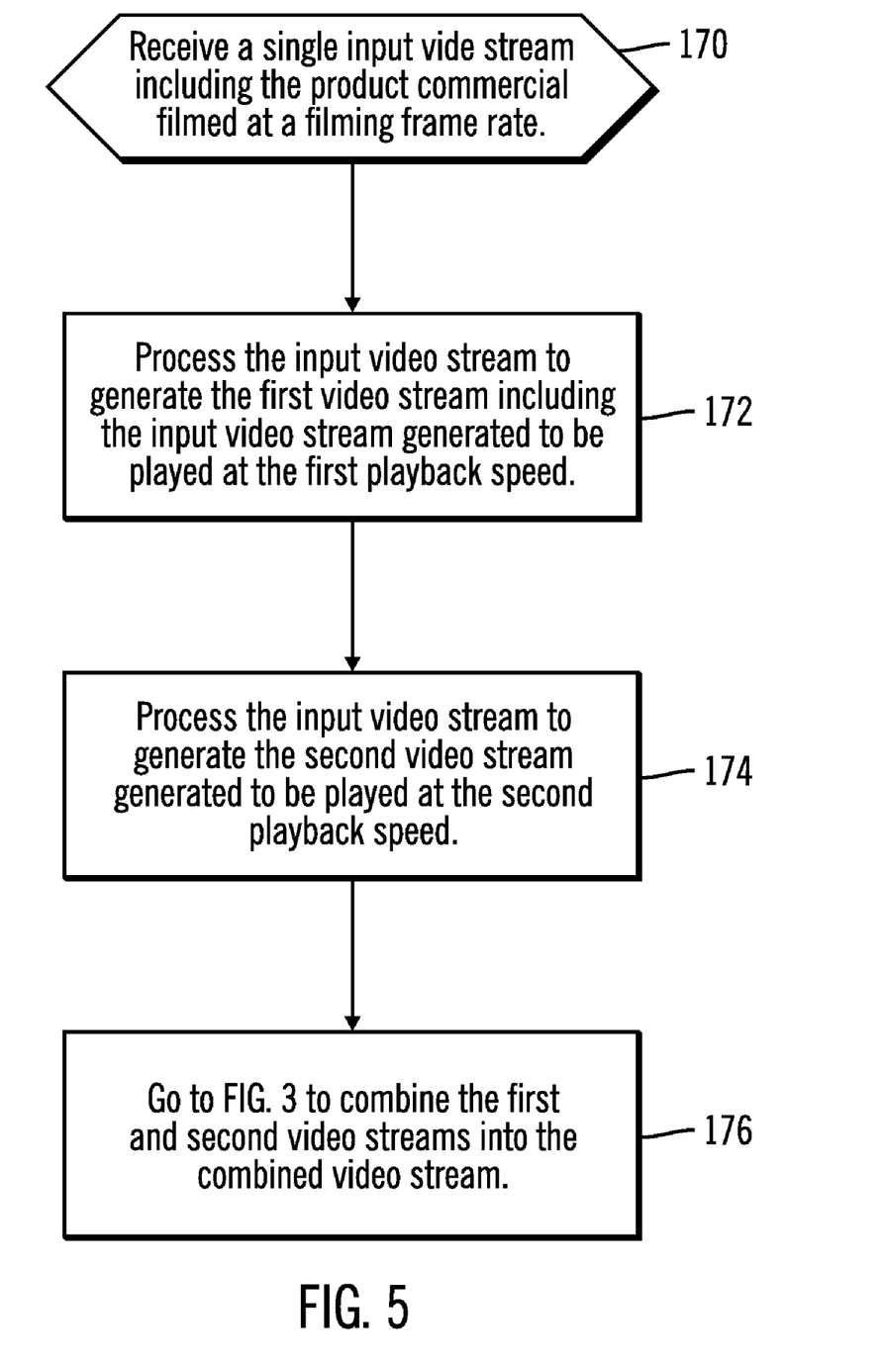

FIG. 5 illustrates an alternative embodiment of operations performed by the video editor 8 to produce the first 10 and second 12 video streams from a common input video stream. Upon receiving (at block 170) a single input video stream including the product commercial filmed at a filming frame rate, the video editor 8 processes (at block 172) the input video stream to generate the first video stream 10 including the input video stream generated to be played at the first playback speed and processes (at block 174) the input video stream to generate the second video stream 12 generated to be played at the second playback speed. The second playback speed may be greater than the first playback speed. Control may then proceed (at block 176) to FIG. 3 to combine the first 10 and second 12 video streams into the combined video stream 14.

In one embodiment, the video editor 8 may receive user input indicating relative or absolute sizes for the first 10 and second 12 panels in each frame 50 of the combined video stream 14. The video editor 8 may generate the first 10 and second 12 panels to have sizes in the frames 50 of the combined video stream 14 corresponding to their indicated sizes. In one embodiment, the sizes of the first and second panels may be based on percentages of a viewing audience estimated to watch the first 10 and second 12 panels. The first 52 or second 54 panel having a higher estimated viewing audience may be configured to utilize a greater size in the frame 50 than the first or second panel having a lower estimated viewing audience.

In one embodiment, the video editor 8 may comprise post production software to process the video streams 10 and 20 to generate a combined video stream 14 that is inserted into a broadcast, such as a cable television or broadcast television, program as a commercial segment. If the user is viewing the broadcast program using a digital video record (DVR) device and selects to fast forward through commercials, then in fast forward mode the commercial content rendered in the second panel 54 of the combined video stream 14 will appear slower or at a normal speed while the commercial in the first panel 52 will appear fast forwarded.

Described embodiments provide techniques for generating two video streams of a commercial video production in separate panels 52, 54 of the frames 50 of the combined video stream 14, where the video in the panels 52, 54 may appear at different speeds to accommodate the speeds at which the user runs the combined vide stream in a video playback device.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable storage medium", where a processor may read and execute the code from the computer storage readable medium. A computer readable storage medium may comprise storage media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The "article of manufacture" may comprise a transmitting station and/or a receiving station for transmitting and receiving transmission signals in which the code or logic is encoded, where the code or logic encoded in the transmission signal may be decoded and stored in hardware or a computer readable storage medium at the receiving and transmitting stations or devices. An "article of manufacture" comprises a computer readable storage medium, hardware device, and/or transmission transmitters or receivers in which code or logic may be implemented. Those skilled in the art will recognize that many modifications may be made to this configuration without departing from the scope of the present invention, and that the article of manufacture may comprise suitable information bearing medium known in the art.

FIG. 2 shows two panels generated to render content from first 10 and second 12 video streams. In further embodiments, there may be more than two panels for more than two corresponding video streams included in the frames 50. The multiple at least two panels may display the product commercial for more than two different playback speeds at which the user of the playback device may watch or fast forward through commercials.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3, 4, and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
processing a first video stream having a plurality of frames including a first product commercial generated to be played at a first playback speed;
processing a second video stream having a plurality of frames including a second product commercial generated to be played at a second playback speed, wherein the second playback speed is faster than the first playback speed; and
generating a combined video stream comprising a plurality of frames, wherein each of the frames in the combined video stream include a first panel to display content from the frames of the first video stream and a second panel to display content from the frames of the second video stream, wherein when the combined video stream is played at the first playback speed the second video stream in the second panel of the frames of the combined video stream is rendered to appear at a slower speed than the second playback speed for which it was generated and when the combined video stream is played at the second playback speed the first video stream in the first panel of the frames of the combined video stream is rendered to appear at a faster speed than the first playback speed for which it was generated.

2. The method of claim 1, wherein the first and second video streams have first and second frame rates, respectively, wherein the first frame rate is greater than the second frame rate.

3. The method of claim 2, wherein generating the combined video stream comprises:
generating each frame of the first video stream into the first panel of at least one frame in the combined video stream at a first ratio of frames in the first video stream to frames in the combined video stream;
generating each frame of the second video stream into the second panel of at least one frame in the combined video stream at a second ratio of frames in the second video stream to frames in the combined video stream, wherein the second ratio is greater than the first ratio such that frames in the second video stream are generated into more frames in the second panel in the combined video stream than the frames in the first video stream are generated into the frames of the first panel in the combined video stream.

4. The method of claim 2, wherein the first and second video streams are separately filmed at the first and the second frame rates, respectively.

5. The method of claim 1, wherein the first and second video streams are separately filmed at a same frame rate, wherein the second video stream includes events included in the first video stream, wherein the same events in the second video stream appear on more frames than the same events in the first video stream.

6. The method of claim 1, further comprising:
receiving an input video stream including product commercial content filmed at a filming frame rate;
processing the input video stream to generate the first video stream including the input video stream generated to be played at the first playback speed, wherein the first product commercial comprises the product commercial content at the first playback speed; and
processing the input video stream to generate the second video stream generated to be played at the second playback speed, wherein the second product commercial comprises the product commercial content at the second playback speed.

7. The method of claim 6, wherein the first playback speed is at the filming frame rate and wherein the second playback speed is at a frame rate less than the filming frame rate.

8. The method of claim 1, wherein the first playback speed is a normal speed and wherein the second playback speed is a fast forward speed for a video player device.

9. The method of claim 1, wherein the processing and generating operations are performed by post production software to generate the product commercial in the first and second panels of the combined video stream.

10. The method of claim 1, further comprising:
receiving user input indicating sizes of the first and second panels in each frame of the combined video stream, wherein the first and second panels have sizes in the combined video stream corresponding to their indicated sizes.

11. The method of claim 10, wherein the indicated sizes of the first and second panels are based on percentages of a viewing audience estimated to watch the first and second panels, wherein the first or second panel having a higher estimated viewing audience is set to a greater size in the frame than the first or second panel having a lower estimated viewing audience.

12. The method of claim 1, wherein the combined video stream is inserted in a broadcast as a commercial segment.

13. The method of claim 1, wherein the first and second product commercials comprise commercials for different products.

14. The method of claim 1, wherein the first and second product commercials comprise commercials for a same product.

15. The method of claim 1, wherein the first and second video streams include commercials for a plurality of products.

16. A system, comprising:
a processor;
a computer readable medium including a video editor executed by the processor to perform operations, the operations comprising:
processing a first video stream having a plurality of frames including a first product commercial generated to be played at a first playback speed;
processing a second video stream having a plurality of frames including a second product commercial generated to be played at a second playback speed, wherein the second playback speed is faster than the first playback speed; and
generating a combined video stream comprising a plurality of frames, wherein each of the frames in the combined video stream include a first panel to display content from the frames of the first video stream and a second panel to display the content from the frames of the second video stream, wherein when the combined video stream is played at the first playback speed the second video stream in the second panel of the frames of the combined video stream is rendered to appear at a slower speed than the second playback speed for which it was generated and when the combined video stream is played at the second playback speed the first video stream in the first panel of the frames of the combined video stream is rendered to appear at a faster speed than the first playback speed for which it was generated.

17. The system of claim 16, wherein the first and second video streams have first and second frame rates, respectively, wherein the first frame rate is greater than the second frame rate.

18. The system of claim 17, wherein generating the combined video stream comprises:
generating each frame of the first video stream into the first panel of at least one frame in the combined video stream at a first ratio of frames in the first video stream to frames in the combined video stream;
generating each frame of the second video stream into the second panel of at least one frame in the combined video stream at a second ratio of frames in the second video stream to frames in the combined video stream, wherein the second ratio is greater than the first ratio such that frames in the second video stream are generated into more frames in the second panel in the combined video stream than the frames in the first video stream are generated into the frames of the first panel in the combined video stream.

19. The system of claim 16, wherein the first and second video streams are separately filmed at a same frame rate, wherein the second video stream includes events included in the first video stream, wherein the same events in the second video stream appear on more frames than the same events in the first video stream.

20. The system of claim 16, wherein the operations further comprise:

receiving an input video stream including product commercial content filmed at a filming frame rate;
processing the input video stream to generate the first video stream including the input video stream generated to be played at the first playback speed, wherein the first product commercial comprises the product commercial content at the first playback speed; and
processing the input video stream to generate the second video stream generated to be played at the second playback speed, wherein the second product commercial comprises the product commercial content at the second playback speed.

21. An article of manufacture comprising a computer readable storage device storing a program executed to perform operations, the operations comprising:
processing a first video stream having a plurality of frames including a first product commercial generated to be played at a first playback speed;
processing a second video stream having a plurality of frames including a second product commercial generated to be played at a second playback speed, wherein the second playback speed is faster than the first playback speed; and
generating a combined video stream comprising a plurality of frames, wherein each of the frames in the combined video stream include a first panel to display content from the frames of the first video stream and a second panel to display the content from the frames the second video stream, wherein when the combined video stream is played at the first playback speed the second video stream in the second panel of the frames of the combined video stream is rendered to appear at a slower speed than the second playback speed for which it was generated and when the combined video stream is played at the second playback speed the first video stream in the first panel of the frames of the combined video stream is rendered to appear at a faster speed than the first playback speed for which it was generated.

22. The article of manufacture of claim 21, wherein the first and second video streams have first and second frame rates, respectively, wherein the first frame rate is greater than the second frame rate.

23. The article of manufacture of claim 22, wherein generating the combined video stream comprises:
generating each frame of the first video stream into the first panel at least one frame in the combined video stream at a first ratio of frames in the first video stream to frames in the combined video stream;
generating each frame of the second video stream into the second panel of at least one frame in the combined video stream at a second ratio of frames in the second video stream to frames in the combined video stream, wherein the second ratio is greater than the first ratio such that frames in the second video stream are generated into more frames in the second panel in the combined video stream than the frames in the first video stream are generated into the frames of the first panel in the combined video stream.

24. The article of manufacture of claim 21, wherein the first and second video streams are separately filmed at a same frame rate, wherein the second video stream includes events included in the first video stream, wherein the same events in the second video stream appear on more frames than the same events in the first video stream.

25. The article of manufacture of claim 21, wherein the operations further comprise:

receiving an input video stream including product commercial content filmed at a filming frame rate;

processing the input video stream to generate the first video stream including the input video stream generated to be played at the first playback speed, wherein the first product commercial comprises the product commercial content at the first playback speed; and processing the input video stream to generate the second video stream generated to be played at the second playback speed, wherein the second product commercial comprises the product commercial content at the second playback speed.

* * * * *